(12) United States Patent
Busscher et al.

(10) Patent No.: US 10,889,917 B2
(45) Date of Patent: Jan. 12, 2021

(54) PROCESS FOR SPINNING MULTIFILAMENT YARN

(71) Applicant: TEIJIN ARAMID B.V., Arnhem (NL)

(72) Inventors: Leonardus Antonius Godfried Busscher, Duiven (NL); Michiel Jan Adriaan Jaarsveld, Utrecht (NL)

(73) Assignee: TEIJIN ARAMID B.V., Arnhem (NL)

( * ) Notice: Subject to any disclaimer, the term of this patent is extended or adjusted under 35 U.S.C. 154(b) by 346 days.

(21) Appl. No.: 14/346,807

(22) PCT Filed: Oct. 2, 2012

(86) PCT No.: PCT/EP2012/069397
§ 371 (c)(1),
(2) Date: Mar. 24, 2014

(87) PCT Pub. No.: WO2013/050336
PCT Pub. Date: Apr. 11, 2013

(65) Prior Publication Data
US 2014/0290205 A1    Oct. 2, 2014

(30) Foreign Application Priority Data

Oct. 5, 2011 (EP) ..................... 11183923

(51) Int. Cl.
*D01D 4/02* (2006.01)
*D01D 5/088* (2006.01)
(Continued)

(52) U.S. Cl.
CPC ........... *D01F 6/60* (2013.01); *B29D 99/0078* (2013.01); *D01D 4/02* (2013.01); *D01F 6/605* (2013.01)

(58) Field of Classification Search
CPC ........ B29D 99/0078; D01D 4/02; D01F 6/60; D01F 6/605
See application file for complete search history.

(56) References Cited

U.S. PATENT DOCUMENTS 4,248,581 A * 2/1981 Harrison .................. D01D 4/02
264/211.14
4,283,364 A * 8/1981 Capps ...................... D01D 5/08
264/177.13
(Continued)

FOREIGN PATENT DOCUMENTS

DE     2 141 285 A1    3/1973
GB       986719 A      3/1965
(Continued)

OTHER PUBLICATIONS

Dec. 13, 2012 International Search Report issued in PCT Application No. PCT/EP2012/069397.
(Continued)

*Primary Examiner* — Holly Rickman
*Assistant Examiner* — Linda N Chau
(74) *Attorney, Agent, or Firm* — Oliff PLC

(57) ABSTRACT

A spinneret is used to reduce filament breakage during spinning of multifilament yarn being stretched at a high stretch ratio. The spinneret has a first group of spinning holes with capillaries and a second group of spinning holes with capillaries. The capillaries of the second group of spinning holes have a lower length to diameter (L/D) ratio than the capillaries of the first group of spinning holes. All of the capillaries have the same diameter, which is 100 μm or less.

20 Claims, 1 Drawing Sheet

(51) Int. Cl.
*D01F 6/60* (2006.01)
*B29D 99/00* (2010.01)

(56) References Cited

U.S. PATENT DOCUMENTS

| | | | |
|---|---|---|---|
| 4,330,989 A | 5/1982 | Schmieder et al. | |
| 4,383,817 A * | 5/1983 | Mirhej | D01D 4/02 264/103 |
| 5,652,001 A * | 7/1997 | Perry | D01F 2/00 264/176.1 |
| 2004/0067710 A1* | 4/2004 | Tsujiyama | B32B 5/26 442/329 |

FOREIGN PATENT DOCUMENTS

| | | |
|---|---|---|
| JP | S57-161112 A | 10/1982 |
| JP | S61-194208 A | 8/1986 |
| JP | S63-12728 A | 1/1988 |
| JP | H2-33325 | 2/1990 |
| JP | H8-39904 | 2/1996 |
| JP | 2004-176212 A | 6/2004 |
| JP | 2005-344266 A | 12/2005 |
| JP | 2006-118060 A | 5/2006 |
| JP | 2006-200096 A | 8/2006 |
| JP | 2010-37664 A | 2/2010 |
| JP | 2010-509506 A | 3/2010 |
| SU | 26773 A1 | 6/1932 |
| WO | WO 2005/061773 A1 | 7/2005 |
| WO | 2008/045492 A2 | 4/2008 |
| WO | WO 2008/045492 A2 | 4/2008 |
| WO | 2008/082092 A1 | 7/2008 |

OTHER PUBLICATIONS

Dec. 13, 2012 Written Opinion of the International Searching Authority issued in PCT Application No. PCT/EP2012/069397.
Translation of Sep. 9, 2016 Office Action issued in Russian Application No. 2014117644.
Translation of Aug. 21, 2015 Office Action issued in Japanese Application No. 2014-533849.
Translation of Jan. 5, 2016 Office Action issued in Japanese Application No. 2014-533849.
Translation of Jul. 7, 2016 Office Action issued in Japanese Application No. 2014-533849.
Translation of Dec. 4, 2017 Office Action issued in Japanese Application No. 2017-003409.

* cited by examiner

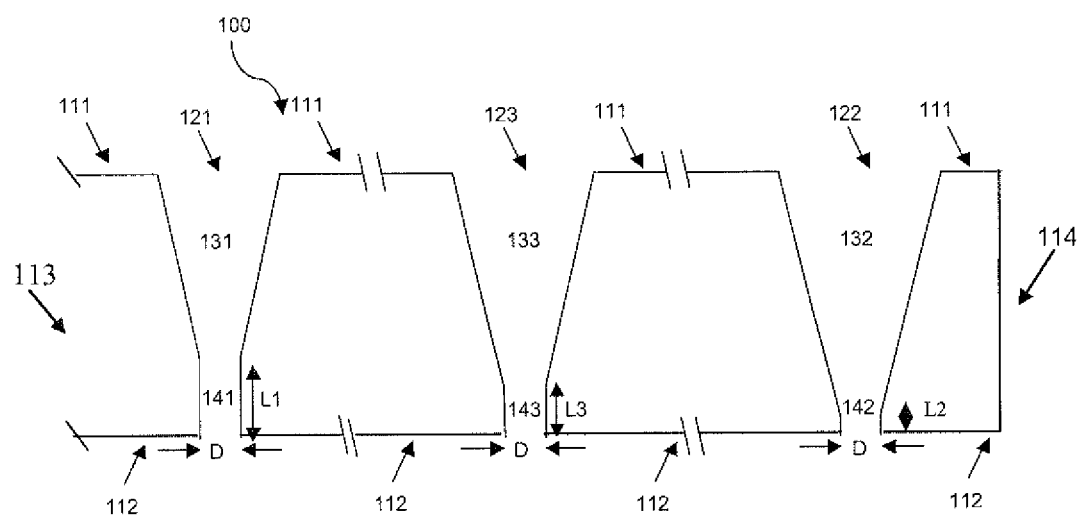

PROCESS FOR SPINNING MULTIFILAMENT YARN

BACKGROUND

The invention pertains to a spinneret having multiple spinning holes having capillaries having different L/D ratios. The invention pertains also to a process for manufacturing multifilament yarn. Furthermore, the invention pertains to multifilament yarn having a reduced number of filaments having a diameter less than the average diameter.

Processes for spinning multifilament yarns are well known. Generally, these processes comprise the steps of extruding a polymer melt or a polymer solution through a spinneret comprising multiple spinning holes with capillaries, wherein all spinning holes with capillaries have the same dimensions. In processes where process conditions are close to the maximum allowable, it is of vital interest that all filaments have the same dimensions. However, due to uncontrollable anomalies in the spinning process not all filaments have the same dimensions, even if all spinning holes have the same dimensions. There are filaments with smaller diameters than average, and filaments with bigger diameters than average. Especially for filaments with smaller dimensions than average, some process conditions are over the limit. Process conditions could be adapted to the limit of the smallest filaments, but in that case the conditions are below the optimum for all the other filaments.

For example, high stretching ratios and/or smaller diameter capillaries may be used to obtain smaller diameter filaments in a multifilament yarn. Smaller diameter filaments can be solidified in a more uniformly manner, thus reducing differences, for example in polymer orientation, between the core and the skin of the filament. Reduced core-skin differences in individual filaments can yield higher strength in the multifilament yarn. Smaller diameter filaments are also preferred in ballistic applications as fabrics made from multifilament yarns comprising smaller diameter filaments exhibit improved antiballistic performance.

Smaller diameter capillaries are only possible to a certain extent and therefore high stretching ratios are applied as well. Doing so, in many cases a high level of filament breakage is observed in the multifilament yarn during spinning, which can result in insufficient mechanical properties of the multifilament yarn. The spinning process may even have to be interrupted, when broken filaments are wrapped around a roller or get stuck on other equipment of the spinning line. Spinning of filaments may also become unstable resulting in filaments with large variations in cross section area along their length.

SUMMARY

It is an object of the present invention to improve the performance of spinning processes for spinning multifilament yarn and to improve the distribution of filament cross section areas and/or the properties of multifilament yarns.

The object of the invention is achieved by a spinneret having a first surface and a second surface parallel to the first surface, wherein the spinneret comprises multiple spinning holes, each spinning hole comprising an entrance opening, a conically shaped channel and a cylindrically shaped capillary, wherein the exit side of all the capillaries are located in the plane of the second surface of the spinneret, wherein the spinneret comprises at least a first group of spinning holes with capillaries and a second group of spinning holes with capillaries, wherein the capillaries of the second group of spinning holes have a lower L/D ratio than the capillaries of the first group of spinning holes, wherein all capillaries have the same diameter and wherein the diameter of all the capillaries is 100 μm or less.

The capillaries within a single group of spinning holes have a length which is constant within the limits of spinneret manufacture. In general, the length of the capillaries in a group of spinning holes will vary by not more than 15 μm, preferably by not more than 10 μm, more preferably by not more than 5 μm.

Without being bound to theory, it is believed that breakage of filaments during spinning of multifilament yarn occurs mainly in those extruded filaments, which are subjected to the highest stretching ratios.

The stretching ratio of a filament is to be understood to mean the ratio of the speed of the filament at the first speed controlled roller in the spinning line, which fixes the speed of the multifilament yarn, over the superficial velocity of the polymeric fluid at the exit side of the capillary from which the filament is extruded. The superficial velocity can be calculated as the volume of polymeric fluid extruded from the exit side of the capillary divided by the cross sectional area of the capillary.

Analogously, the average stretching ratio of a multifilament yarn is the ratio of the speed of the multifilament yarn at the first speed controlled roller of the spinning line, which fixes the speed of the multifilament yarn, over the average superficial velocity of the polymeric fluid at the exit sides of all the capillaries from which the filaments are extruded. The average superficial velocity of the polymeric fluid can be calculated as the total volume of polymeric fluid extruded from the spinneret divided by the sum of the cross sectional area of all the capillaries in the spinneret.

As the speed of all filaments in the multifilament yarn is fixed at the first speed controlled roller of the spinning line, the highest stretching ratios are observed in filaments, which are extruded from capillaries with the lowest superficial velocity of the polymeric fluid.

BRIEF DESCRIPTION OF THE DRAWING

The FIGURE is a schematic representation of a spinneret according to the invention.

DETAILED DESCRIPTION OF THE EMBODIMENTS

The spinneret according to present invention reduces the stretching ratio in the filaments, which are prone to breakage. In the capillaries of the second group of spinning holes, having capillaries with a lower L/D ratio, the superficial velocity of the polymeric fluid is increased to reduce the stretching ratio of the filaments extruded from the second group of spinning holes.

The multiple spinning holes in the spinneret are preferably located in one or more fields, each field comprising multiple spinning holes. Preferably, the spinneret comprises at least 2 fields, more preferably at least 4 fields, most preferably at least 8 fields. Preferably, each field in the spinneret comprises at least 25 spinning holes, more preferably at least 50, even more preferably at least 70, most preferably at least 100 spinning holes. Preferably, each field in the spinneret comprises at most 1000 spinning holes, more preferably at most 750, even more preferably at most 500, most preferably at most 250 spinning holes.

The spinning holes may be present in each field of the spinneret in any desired spatial distribution. The spinning holes may for example be present in the spinneret in concentric circles, or in parallel rows. When the spinning holes are present in parallel rows, the spinning holes may form a pattern of squares, wherein the spinning holes define the corners of the squares and wherein the sides of the squares are parallel to the rows of spinning holes. Alternatively, the spinning holes may be present in staggered rows, whereby the spinning holes in neighboring rows are off-set from one another, preferably by 50% of the distance between spinning holes in a single row.

The spinning holes with capillaries of the second group may be present in a single line of spinning holes or may preferably be located at at least one, some or all of the outer edges of each field. It has been observed that in processes for spinning multifilament yarns, most of the filament breakage occurs in filaments extruded from spinning holes located at the outer edge(s) of the field(s) of the spinneret.

In another embodiment, the spinneret comprises three groups of spinning holes with capillaries, wherein the third group of spinning holes has capillaries with a lower L/D ratio than the capillaries of the first group of spinning holes, and wherein the third group of spinning holes has capillaries with a higher L/D ratio than the capillaries of the second group of spinning holes. Preferably, the second group of spinning holes is located at the outer edges of each field, the first group of spinning holes located at the center portion of each field, and third group of spinning holes located between the first group of capillaries and the second group of spinning holes.

The spinneret may even comprise more than three groups of spinning holes, each group having capillaries with a different L/D ratio, to minimize filament breakage during spinning and/or to optimize the distribution of filament cross section areas and/or the properties of the multifilament yarn. Preferably, the spinning holes with capillaries having the highest L/D ratio are located at the center of each field, and the spinning holes with capillaries having the lowest L/D ratio are preferably located at the outer edge(s) of each field. The other group(s) of spinning holes with capillaries in each field of the spinneret is/are located between the group of spinning holes with capillaries having the highest L/D ratio and the group of spinning holes with capillaries having the lowest L/D ratio in such a way that the L/D ratio of the capillaries decreases from the center of the field to the outer edge(s) of the field.

In a preferred embodiment, the L/D ratio of the capillaries of the second group of spinning holes is at least 10% smaller, preferably at least 25% smaller, more preferably at least 40% smaller, most preferably at least 50% smaller than the L/D ratio of the capillaries of the first group of spinning holes. The L/D ratio of the capillaries of the first group of spinning holes is preferably at least 1.00, more preferably at least 1.25, even more preferably at least 1.75, most preferably at least 2.00. The L/D ratio of the capillaries of the second group of spinning holes is preferably 1.75 or less, more preferably 1.50 or less, even more preferably 1.25 or less, most preferably 1.00 or less.

In an embodiment, the diameter of the capillaries of the second group of spinning holes is equal to the diameter of the capillaries first group of spinning holes and, if applied, equal to the diameter of the capillaries of the third and further group(s) of spinning holes. Equal diameter of the capillaries has to be understood to mean that the capillaries have a diameter which is equal within the limits of spinneret manufacture. In general, the diameter of the capillaries in a spinneret will vary by not more than 2 µm, preferably by not more than 1 µm.

The diameter of the capillaries may be 100 µm or less, preferably 75 µm or less, more preferably 60 µm or less, even more preferably 50 µm or less, most preferably 45 µm. The diameter of the capillaries is preferably at least 10 µm, more preferably at least 20 µm, most preferably at least 30 µm.

The spinneret according to the present invention can advantageously be used to manufacture multifilament yarns. The spinneret is especially advantageous to manufacture multifilament yarns having less filaments being subjected to a too high stretching ratio, wherein the minimum cross section area of a single filament in the multifilament yarn is at least 75% of the average cross section area of all the filaments in the multifilament yarn, preferably at least 80%, more preferably at least 85%, most preferably at least 90%.

Multifilament yarns having reduced numbers of filaments with a small cross section area will generally exhibit a distribution of filament cross section areas with a skewness of 0 or greater. Preferably, the distribution of filament cross section areas in the multifilament yarn has a skewness greater than 0.25, preferably greater than 0.40, more preferably greater than 0.50, most preferably greater than 0.60.

The distribution of cross section area of the filaments in a multifilament yarn is determined by embedding a piece of multifilament yarn in a transparent epoxy resin composition consisting of four parts by weight of Buehler Epoheat epoxy resin and one part by weight of Buehler Epoheat epoxy hardener. The resin composition is hardened for at least 8 hours at 40° C. in a sample tube. A slice of 2 mm is cut from the hardened resin comprising the piece of multifilament yarn using a Isomet 5000 diamond cutter. The slice is ground with P1200, P2500 and P4000 silicon carbide grinding paper until the slice has a thickness of 1 mm, and subsequently polished on both sides with White Felt polishing cloth and Micropolish Alpha Aluminum-oxide suspensions starting from 5 µm to 1 µm. Finally the slice is polished on both sides with Chemomet polishing cloth and Masterprep Aluminum-oxide suspension of 0.05 µm. The slice is transferred into a microscope having an objective lens 20×, and exposed to UV light. The cross sectional area of the filaments is determined using image analysis software until at least 100 individual filaments have been evaluated and the distribution of cross section area of the filaments in a multifilament yarn can be established according to standard statistical methods.

Skewness is well known from statistical analysis, and is a measure of the asymmetry of a distribution. The skewness can be positive or negative or zero. Qualitatively, a positive skewness indicates that the tail of the lower values of a distribution is smaller than the tail of the higher values. A negative skewness indicates that the tail of the lower values of a distribution is larger than the tail of the higher values. A zero value indicates that the values are evenly distributed on both sides of the average value, typically the distribution is symmetrical.

The skewness of a distribution of cross sectional area of the filaments in a multifilament yarn can be calculated using the following formula $$\text{Skewness} = \frac{1}{n} \frac{\sum_{i=1}^{n}(X_i - \overline{X})^3}{S^3}$$

Wherein
n is the number of filaments in the multifilament yarn
$X_i$ is the value of the cross sectional area of filament i X̄ is the average value of the cross sectional area of all filaments in the multifilament yarn S is the standard deviation of the distribution The object of the invention is achieved by a process for manufacturing multifilament yarn, wherein a polymeric fluid is extruded through a spinneret according to any of the embodiments as described above to form extruded filaments and wherein the extruded filaments are accelerated by a speed controlled roller.

In an embodiment, the polymeric fluid is a polymeric melt, and may for example be selected from polyolefins, such as any type of polyethylene (for example LDPE, LLDPE, HDPE or UHMWPE) or polypropylene, polyesters, such as polyethylene terephthalate (PET), polybutylene terephthalate (PBT) or polytrimethylene terephthalate (PTT), polyamides, such as for example PA6 or PA66, any copolymers thereof, or a mixture of at least two thereof.

In another embodiment, the polymeric fluid is a polymer and/or a copolymer in a suitable solvent. The polymer in a suitable solvent may form a liquid crystalline solution.

The polymer and/or copolymer preferably consists predominately of an aromatic polyamide. Such (co-)polymers are known and can be prepared from various monomers including but not limited to aromatic para-diamines or derivatives thereof with aromatic para-diacids or derivatives thereof.

Examples of suitable aromatic diamines are para-phenylene diamine (PPD), 2-chloro-p-phenylenediamine (Cl-PPD), Me-PPD, MeO-PPD, and the like. Preferably PPD and/or Cl-PPD are used. Also preferred as an aromatic amine is (5-(6)-amino-2-(p-aminophenyl)benzimidazole) (DAPBI).

Examples for suitable derivatives of aromatic para-diacids are para-diacid terephthaloyl dichloride (TDC) or Cl-TDC (2-chloroterephthaloyl dichloride) as well as 2,6-napthaloyl dichloride.

Preferred polymers and copolymers are poly(para-phenylene terephthalamide) (PPTA) and a DAPBI-PPD copolymer that is obtained by co-polymerizing the aromatic diamine monomer 5-(6)-amino-2-(paminophenyl)benzimidazole and the aromatic para-diamine monomer p-phenylene diamine (PPD), and the aromatic para-diacid derivative terephthaloyl dichloride (TDC).

Suitable solvents for para-aromatic polyamides are for example a mixture of a polar amide solvent selected from N-methyl-2-pyrrolidone, N,N'-dimethylformamide, N,N'-dimethylacetamide, tetramethylurea, and mixtures thereof, water, and an alkali or alkaline earth metal chloride, such as calcium chloride (CaCl$_2$) or lithium chloride (LiCl), or sulfuric acid. Preferably, the solvent is sulfuric acid.

A diameter of the capillaries of 100 µm or less is especially advantageous when the polymeric fluid is a polymer and/or a copolymer in a suitable solvent. The polymer and/or a copolymer in a suitable solvent generally results in lower pressures at the entrance opening of the spinning holes and/or in the capillaries. Preferably, the diameter of the capillaries is 75 µm or less, more preferably 60 µm or less, even more preferably 50 µm or less, most preferably 45 µm. The diameter of the capillaries is preferably at least 10 µm, more preferably at least 20 µm, most preferably at least 30 µm.

A multifilament yarn can be obtained using the spinneret according to any of the embodiments as described above, wherein the number of filaments in the multifilament yarn having a too small cross section area is reduced. The minimum cross section area of a single filament in the multifilament yarn is at least 75% of the average cross section area of all the filaments in the multifilament yarn, preferably at least 80%, more preferably at least 85%, most preferably at least 90%.

Multifilament yarns having reduced numbers of filaments with a smaller cross section area than average will generally exhibit a distribution of filament cross section areas with a skewness of 0 or greater. Preferably, the distribution of filament cross section areas in the multifilament yarn has a skewness greater than 0.25, preferably greater than 0.40, more preferably greater than 0.50, most preferably greater than 0.60.

The FIGURE illustrates a part of a field in a spinneret (100), the spinneret having a first surface (111) and a second surface (112) parallel to the first surface. The spinneret comprises multiple spinning holes, each spinning hole comprising an entrance opening (121, 122, 123), a conically shaped channel (131, 132, 133) and a cylindrically shaped capillary (141, 142, 143). The entrance openings of all conically shaped channels are located in the plane of the first surface (111) of the spinneret. The exit sides of all capillaries are located in the plane of the second surface (112) of the spinneret. The cylindrically shaped capillaries have a diameter (D) and a length (L1, L2, L3). All the capillaries in the spinneret have the same diameter (D). The spinneret comprises at least a first group of spinning holes with capillaries (141) and a second group of spinning holes with capillaries (142), wherein the capillaries (142) of the second group of spinning holes has a lower L/D ratio than the capillaries (141) of the first group of spinning holes. The capillaries (142) of the second group of spinning holes have a smaller length (L2) than the length (L1) of the capillaries (141) of the first group of spinning holes. The capillaries (142) of the second group are preferably located at the outer edge (114) of a field in the spinneret, and the capillaries (141) of the first group are preferably located at the center portion of (113) of a field in the spinneret. When the L/D ratio of a capillary (142, 143) is reduced, the diameter of the entrance of the conically shaped channel (132, 133) is increased as the total length of all spinning holes is equal.

The spinneret may comprise a third group of spinning holes with capillaries (143) or may even comprise more than three groups of spinning holes (not shown), each group having capillaries with a different L/D ratio. The capillaries (143) of the third group of spinning holes have a lower L/D ratio than the capillaries (141) of the first group of spinning holes, and a higher L/D ratio than the capillaries (142) of the second group of spinning holes. The capillaries (143) of the third group of spinning holes have a smaller length (L3) than the length (L1) of the capillaries (131) of the first group of spinning holes, and have a higher length (L3) than the length (L2) of the capillaries (132) of the second group of spinning holes.

Example 1

Multifilament yarns have been manufactured by extruding a solution of PPTA in sulphuric acid through a spinneret. The spinneret comprised 8 fields with 250 spinning holes in each field. Each field comprises two groups of spinning holes with capillaries having a diameter of 45 µm.

The first group of spinning holes has capillaries with an L/D ratio of 2.0, the second group of spinning holes has capillaries with an L/D ratio of 0.8. The spinning holes are present in each field in staggered rows. The spinning holes with capillaries of the second group were located at the edges of each field.

Comparative Example

The reference multifilament yarn was manufactured according to example 1, with the only difference that all the spinning holes in the spinneret had capillaries with an L/D ratio of 2.0.

In each example, the filaments of all 8 of the fields of the spinneret were collected and evaluated for the filament cross section area distribution.

TABLE 1

|  | Reference | Example 1 |
|---|---|---|
| L/D ratio capillaries group 1 | 2.0 | 2.0 |
| L/D ratio capillaries group 2 | — | 0.8 |
| Number of filaments evaluated | 128 | 100 |
| Average filament cross section area ($\mu m^2$) | 43.94 | 44.88 |
| Median filament cross section area ($\mu m^2$) | 43.37 | 43.44 |
| Minimum filament cross section area ($\mu m^2$) | 31.2 | 34.1 |
| Ratio of minimum cross section over average cross section (%) | 72 | 78 |
| Skewness | 0.2 | 0.7 |

As can be seen from Table 1, the minimum filament cross section area in the multifilament yarns according to the invention is increased from 72% to about 78% of the average cross section area of all the filaments in the multifilament yarn due to an increase of about 6% in the minimum filament diameter.

The invention claimed is:

1. A spinneret comprising:
a first surface,
a second surface parallel to the first surface, and
at least a first group of spinning holes and a second group of spinning holes, each spinning hole comprising an entrance opening, a conically shaped channel, and a cylindrically shaped capillary,
wherein:
an exit side of all the capillaries is located in a plane of the second surface of the spinneret,
the capillaries of the second group of spinning holes have a lower length/diameter (L/D) ratio than the capillaries of the first group of spinning holes,
all capillaries of the spinneret have the same diameter,
the diameter of all capillaries is 100 µm or less, and
the spinneret is configured to manufacture a multifilament yarn in which a minimum cross section area of each single filament of the multifilament yarn is at least 75% of an average cross section area of all filaments in the multifilament yarn.

2. The spinneret according to claim 1, wherein:
the spinning holes of the first group and the spinning holes of the second group are located in the spinneret in at least one field,
each field comprises spinning holes, and
the spinning holes of the second group are located at one or more outer edges of each field.

3. The spinneret according to claim 2, further comprising at least two fields, each field comprising at least 25 spinning holes and at most 1000 spinning holes.

4. The spinneret according to claim 1, further comprising a third group of spinning holes with capillaries, wherein the capillaries of the third group of spinning holes have a lower L/D ratio than the capillaries of the first group of spinning holes, and the capillaries of the third group of spinning holes have a higher L/D ratio than the capillaries of the second group of spinning holes.

5. The spinneret according to claim 4, wherein:
the spinning holes of the first group and the spinning holes of the second group are located in the spinneret in at least one field,
each field comprises spinning holes,
the spinning holes of the second group are located at one or more outer edges of each field,
the first group of spinning holes is located at a center portion of each field, and
the third group of spinning holes is located between the first group of spinning holes and the second group of spinning holes.

6. The spinneret according to claim 1, wherein the L/D ratio of the capillaries of the second group of spinning holes is at least 10% smaller than the L/D ratio of the capillaries of the first group of spinning holes.

7. The spinneret according to claim 1, wherein the capillaries of the first group of spinning holes has an L/D ratio of at least 1.00, and the capillaries of the second group of spinning holes has an L/D ratio of 1.75 or less.

8. The spinneret according to claim 1, wherein each entrance opening of the second group of spinning holes has a larger diameter than a diameter of each entrance opening of the first group of spinning holes.

9. The spinneret according to claim 1, wherein the spinneret is configured to manufacture a multifilament yarn in which a minimum cross section area of each single filament of the multifilament yarn is at least 80% of an average cross section area of all filaments in the multifilament yarn.

10. The spinneret according to claim 1, wherein the spinneret is configured to manufacture a multifilament yarn in which a distribution of filament cross section areas has a skewness greater than 0.25.

11. The spinneret according to claim 1, wherein the spinneret is configured to manufacture a multifilament yarn having an unimodal distribution of filament diameters.

12. The spinneret according to claim 1, wherein the spinneret is configured to increase the superficial velocity of a polymeric fluid in the capillaries of the second group of spinning holes.

13. The spinneret according to claim 1, wherein the spinneret is configured to manufacture a multifilament yarn in which a distribution of properties is improved.

14. The spinneret according to claim 1, wherein the L/D ratio of the capillaries of the second group of spinning holes is at least 25% smaller than the L/D ratio of the capillaries of the first group of spinning holes.

15. The spinneret according to claim 1, wherein the L/D ratio of the capillaries of the second group of spinning holes is at least 40% smaller than the L/D ratio of the capillaries of the first group of spinning holes.

16. A process for manufacturing multifilament yarn comprising extruding a polymeric fluid through the spinneret according to claim 1 to obtain extruded filaments.

17. A process for manufacturing multifilament yarn comprising extruding a polymeric fluid through the spinneret according to claim 1 to obtain extruded filaments, wherein a minimum cross section area of a single filament in the multifilament yarn is at least 75% of an average cross section area of all the filaments in the multifilament yarn.

18. A process for manufacturing multifilament yarn comprising extruding a polymeric fluid through the spinneret according to claim 1, wherein a distribution of filament cross section areas in the multifilament yarn has a skewness greater than 0.25.

19. The process according to claim 17, wherein the polymeric fluid is a polymeric melt or a solution of a polymer in a solvent.

20. The process according to claim 17, wherein the polymeric fluid is a solution of a para-aramide in an acid.

* * * * *